M. P. SIMAS.
CLAM RAKE.
APPLICATION FILED NOV. 22, 1913.
1,141,423.
Patented June 1, 1915.
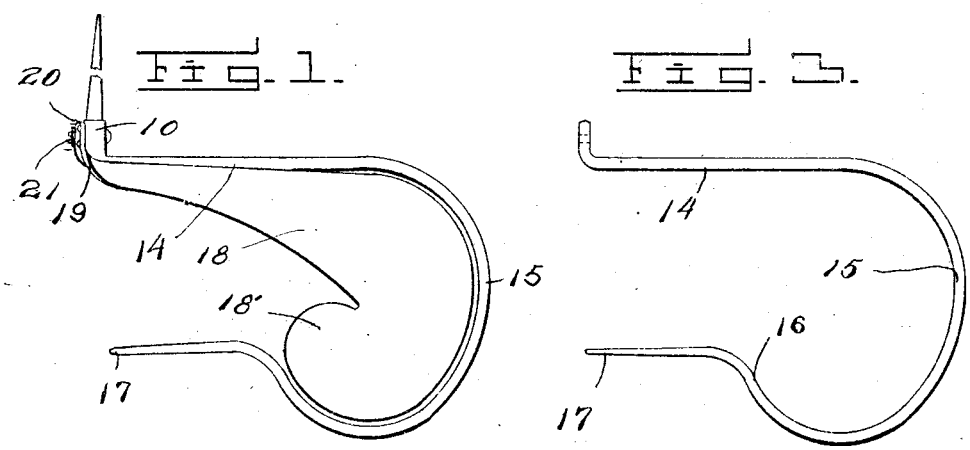
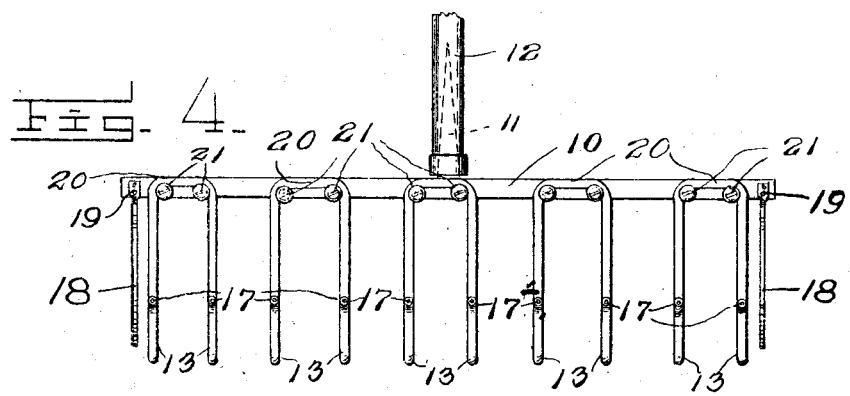
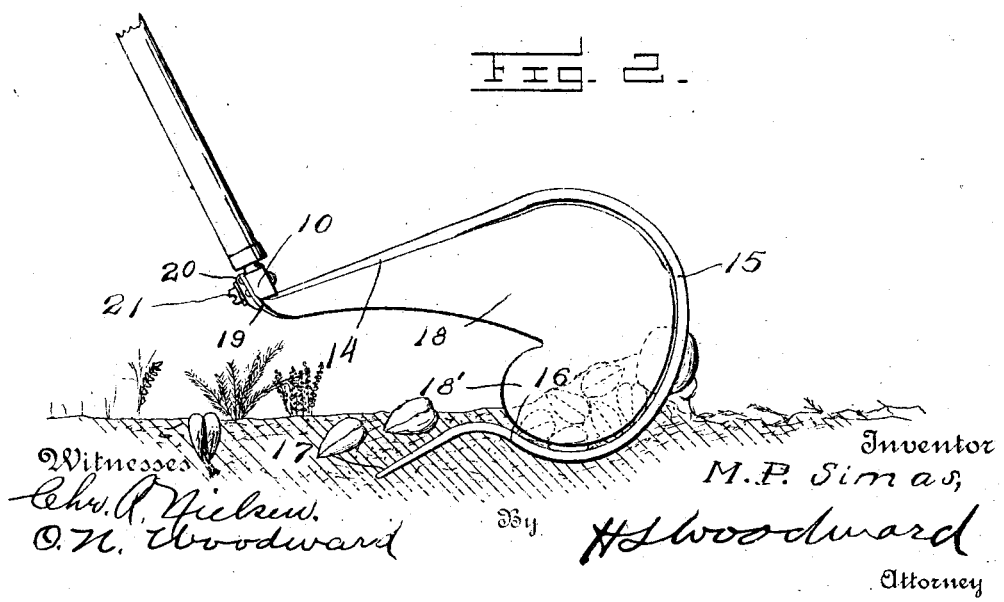

UNITED STATES PATENT OFFICE.

MICHAEL P. SIMAS, OF NEW BEDFORD, MASSACHUSETTS, ASSIGNOR OF ONE-HALF TO JULIO VASCONCELLOS, OF NEW BEDFORD, MASSACHUSETTS.

CLAM-RAKE.

1,141,423.  Specification of Letters Patent.  Patented June 1, 1915.

Application filed November 22, 1913. Serial No. 802,491.

*To all whom it may concern:*

Be it known that I, MICHAEL P. SIMAS, a citizen of the United States, residing at New Bedford, in the county of Bristol and State of Massachusetts, have invented new and useful Improvements in Clam-Rakes, of which the following is a specification.

The invention has for its particular object to increase the efficiency of clam dredging appliances, and is also applicable in gathering other crustaceans. It is especially valuable, it has been found, in hand rakes, minimizing the tendency of a part of the shells gathered to drop from the rake, increasing the catch over thirty per cent. for a given number of operations, as compared to the same operations with the plain rake now generally used and at the same time being very easy to operate. It is an object to so form the tines of the rake that, while being easy to manufacture and adapted to operate with as great facility as the old form of device, it functions so that shells engaged within the rake will not drop out easily, but on the contrary, will be held in such a way that they will be checked against casual discharge. A further object is to provide a novel retainer at the sides of the rake.

Additional objects and advantages will be apparent from the construction and arrangement of parts set forth and shown in the drawings, in which, Figure 1 is a side view of a rake constructed in accordance with my invention. Fig. 2 is a view showing the device in use. Fig. 3 is a detail of one of the tines. Fig. 4 is a front view of the rake.

There is illustrated a rake comprising the metal cross bar 10, having a suitable shank 11 projected upwardly therefrom upon which the customary handle 12 is mounted and upon which there are secured the tines 13. The tines each consist of a horizontal top portion 14 extending rearwardly from the bar 10, thence being curved downward and gradually forward forming a bight, as at 15, the curvature being slightly increased at the lower part of the bight and the tine outwardly thereof curved upwardly abruptly, as at 16, this portion being spaced but a short distance inwardly of the point of the tine, the intermediate end portion of the tine being abruptly curved forwardly and tapered to a point, this forwardly extending end being rectilinear and approximately parallel with the top portion 14. The points 17 of the tines are spaced directly beneath the bar 10, in a plane with the handle. On each end of the bar 10 there is secured a resilient sheet metal guard 18 having a form corresponding to the space within one of the tines, being provided with an enlarged portion 18', and a reduced forwardly extending stem 19, the outer end of which is twisted a quarter of a turn, then bent upwardly and secured upon the bar 10. The rear part of this guard consequently is disposed parallel to the adjacent outer tine.

In practice, these rakes are made about eighteen inches wide, and the tines measure about eight inches from front to rear, the horizontal top portion 14 being about six inches long. The depth of the tines from top to bottom is about six and a half inches, while the length of the horizontal point portion is in the neighborhood of two inches. These proportions are not arbitrary, and may be varied without detriment. The tines may be secured to the cross bar in any customary manner, and as one method the tines are shown formed of steel wire, in pairs, each pair being formed integrally from one piece of wire. The wire is bent sharply at right angles at points equally spaced from its middle, forming a securing loop 20 intended to engage upwardly over the front face of the bar 10, the points of bending corresponding to the spacing of the tines. A short distance from the points of first bending, the wire at each side is again bent to form the top portions 14 extending parallel to each other and at right angles to the loop 20. The formation of the outer end portions of the wire will be understood from the first part of the description. The tines are secured to the bar 10 by means of screws or rivets 21, engaged in suitable openings in the bar 10, these openings being spaced in pairs to lie closely within the bights 20. The renewal and repair of the tines will thus be greatly facilitated and complication of manufacture reduced. The tines are also readily produced by formation from other material than wire, and it may be found desirable to stamp them from sheet metal.

With this construction of rake it will be seen that it may be operated with great ease in the manner customary with the ordinary rake, yet it provides what might be termed a "well" portion in the rake in which the clams will be securely held and prevented from dropping out as readily as is found to be the case with the ordinary rake.

The rake is especially desirable for use in gathering "quahogs", which are found from Cape Cod southward in sandy situations mostly, and quite near the surface; but is also peculiarly efficient in gathering the long shelled clam found farther to the north, and which tends to go deeper.

The principle of the construction shown may be applied in various other embodiments, and I do not regard my invention as limited to the specific device illustrated.

What is claimed:

1. An oyster and clam rake comprising a cross piece, a multiplicity of tines carried thereby, each extending rearwardly therefrom a distance and being then curved down forwardly and upwardly, and their outer end portions extended forwardly spaced below the cross piece.

2. A rake for clams and the like comprising a handle, a cross bar at the lower end thereof, a plurality of alined parallel tines carried by the cross bar each extending rearwardly, thence downwardly, forwardly and upwardly, their outer ends being then extended forwardly a distance, spaced below the bar.

3. A rake for clams and the like comprising an operating means, a cross bar movable thereby, a plurality of parallel tines carried by the bar extending rearwardly therefrom and recurved forwardly, plates at each end of the rake corresponding in form to the space within the tines, their forward portions being secured to the bar, and their rear parts being spaced outwardly of and parallel to the outer tines at each end.

In testimony whereof I have hereunto set my hand in presence of two subscribing witnesses.

MICHAEL P. SIMAS.

Witnesses:
EDWIN A. DOUGLASS,
ANTONE F. LEWIS.